United States Patent [19]

Chabata et al.

[11] Patent Number: 4,542,064

[45] Date of Patent: Sep. 17, 1985

[54] SELF-BONDING ENAMELED WIRE AND HERMETIC COMPRESSOR MOTOR USING THE SAME

[75] Inventors: Sueji Chabata, Tokyo; Keiji Nakano, Inagi; Kichizo Ito, Chiba; Katsuhiko Ueda, Kashiwa; Hirokazu Iizuka, Susono; Hisao Miyako, Shizuoka; Katsumi Fukagawa, Fujinomiya, all of Japan

[73] Assignees: Fujikura Ltd., Tokyo; Tokyo Shibaura Denki Kabushiki Kaisha, Kawasaki, both of Japan

[21] Appl. No.: 582,729

[22] Filed: Feb. 23, 1984

[30] Foreign Application Priority Data

Feb. 28, 1983 [JP] Japan .................................. 58-32277

[51] Int. Cl.$^4$ .............................................. B32B 27/08
[52] U.S. Cl. .............................. 428/383; 174/120 SR;
310/43; 428/380; 428/413; 428/458; 428/473.5;
525/510; 525/528; 525/930
[58] Field of Search ................ 525/510, 930; 428/383,
428/380, 413, 458, 473.5; 427/410; 310/43;
174/120 SR

[56] References Cited

U.S. PATENT DOCUMENTS 3,822,147  7/1974  Koerner et al. ..................... 428/383
4,129,678 12/1978  Seki et al. .......................... 428/383
4,379,807  4/1983  Otis et al. .......................... 428/383
4,439,914  4/1984  Sassano ............................. 427/410

FOREIGN PATENT DOCUMENTS

55-46672 11/1980  Japan .

Primary Examiner—Theodore E. Pertilla
Attorney, Agent, or Firm—Oblon, Fisher, Spivak, McClelland & Maier

[57] ABSTRACT

The self-bonding enameled wire has an electric insulation layer coated thereon and a bonding layer coated over the insulation layer. The bonding layer is prepared with a mixture including: (a) 100 parts by weight of a phenoxy resin and/or an epoxy resin, both the resins containing not larger than 5 ppm of sodium chloride and having a limiting viscosity of not less than 0.440 as measured in tetrahydrofuran solvent at 25° C.; and (b) 20 to 100 weight parts of a n-butylated melamine resin. In place of this n-butylated melamine resin, there is, according to another aspect of the present invention, used 20 to 50 parts by weight of a mixture of a stabilized polyisocyanate and one of a n-butylated melamine resin and a benzoguanamine resin is used. These self-bonding enameled wire are excellent in refrigerant resistance and may be suitably used for windings of a stator coil in hermetic compressor motors.

12 Claims, 6 Drawing Figures

SELF-BONDING ENAMELED WIRE AND HERMETIC COMPRESSOR MOTOR USING THE SAME

This invention relates to a self-bonding enameled wire which is particularly excellent in refrigerant resistance and a hermetic compressor motor (hereinafter referred to as hermetic motor) prepared by using this wire.

In recent years, a variety of refrigeration apparatuses including air conditioners and refrigerators have made great technical progress as their demand increases markedly and their use is widened. Hermetic motors which are used in these refrigeration apparatuses are run under conditions of frequent load changes in an environment containing a refrigerant, such as Freon (trademark), and a refrigerator oil.

On the other hand, a need of reducing the sizes and weights of the apparatuses, improving their performances as well as obtaining high reliability has grown larger with the progress of the techniques. Since a hermetic motor is incorporated in a compressor and run in the presence of both a refrigerant and a refrigerator oil, it is an important requirement that an organic insulating material for magnet wire and the like used in the motors cannot be attacked by these refrigerant and refrigerator oil and does not undergo degradation. Especially, Freon such as R-22 itself is chemically stable and exhibits a very strong dissolving power as a solvent and the load changes exerted on the motor are frequent, so that rapid changes in temperature and pressure occur repeatedly. Accordingly, a material becomes necessary which can withstand fully to these external factors and can be used stably for a long time.

In order to obtain hermetic motors of high reliability, the magnet wire used in the motors must have the following properties in addition to those necessary for general-purpose motors:
(1) it hardly undergoes extraction, softening, swelling, refrigerant absorption, etc., under various conditions of a refrigerant,
(2) it keeps a sufficient dielectric strength and a high insulation resistance in an environment containing both a refrigerant and a refrigerator oil,
(3) it has blistering resistance and overload resistance,
(4) it has heat resistance sufficient to withstand temperature rise resulting from a short-term locked running, and
(5) it has an insulation coating sufficiently tough to withstand deformation due to magnetic vibration, mechanical vibration, etc., in a refrigerant.

These properties are particularly important for imparting high reliability to the insulation system of a hermetic motor.

In order to impart a still higher reliability to a hermetic motor, it is necessary to restrict the magnetostrictive vibration of the magnet wire. For this purpose, fixation or the like of magnet wire with an impregnating varnish of an epoxy resin type has been conventionally carried out. This method, however, had drawbacks that the impregnating varnish becomes fixed over the entire stator of a motor, which causes an unbalance of the clearance between the stator and the rotor or causes an unevenness of the state of wire fixation. An attempt was therefore made to use a self-bonding enameled wire in order to solve the drawbacks and further to improve a working environment and rationalize the impregnation work in the step of varnish impregnation.

Self-bonding enameled wire is actually used in part of small transformers or general-purpose rotary machines, but in its application to oil-immersed apparatuses, it has been used only in stationary apparatuses such as transformers. This is because conventional self-bonding enameled wire has a drawback that, when applied to a hermetic motor, the bonding layer of the self-bonding enameled wire is attacked by a refrigerant, e.g., Freon, having a strong dissolving power, and the resin or the like in the bonding layer is partially dissolved in Freon and deposits on pipes and capillaries extending from the compressor to the condenser and the evaporator and eventually plugs them or deposits on the piston, rotor or cylinder of the compressor, causing their seizure or abrasion.

Accordingly, the inventors of this invention have made a variety of studies on the properties necessary for the bonding layer of self-bonding enameled wire which can be suitably used in hermetic motors.

A conventional self-bonding enameled wire which has as a bonding layer a thermoplastic resin such as polyvinyl butyral resin, polyamide resin, polyester resin, polysulfone resin, polyether-sulfone resin, epoxy resin or phenoxy resin has large temperature dependency after formation of the coil windings. Especially, bond strength at high temperatures (above 100° C.) is weak, and the bonded windings formed with such enameled wire can be separated when magnetic or mechanical vibration is exerted on the coil at high temperatures as in general-purpose B- or F-type rotary apparatuses. Especially, when the wire is applied to a hermetic motor, the bonding layer undergoes swelling, softening, extraction and dissolution due to the presence of Freon or the like having strong dissolving power. Consequently, it is necessary for the bonding layer of self-bonding enameled wire which is used in hermetic motors to have coil-bonding strength at high temperatures sufficient to withstand magnetic or mechanical vibrational forces. Further, it is necessary that the bonding layer not swell or dissolve in the refrigerant at high temperatures. Accordingly, the bonding layer must have a chemically crosslinked three-dimensional structure.

By the way, the bonding layer of self-bonding enameled wire which is already used in oil-immersed transformers is one having a crosslinked three-dimensional structure and, for example, its resin composition consists usually of 80 parts by weight of a phenoxy resin, 20 parts by weight of an epoxy resin and 30 parts by weight of a melamine resin. An investigation was therefore made to ascertain the extent of stabilization which a self-bonding enameled wire having a bonding layer of this composition shows in Freon by using an enameled wire treated with a conventional epoxy impregnating varnish as a control.

First, the percentage of extractables was examined by soaking the wire in Freon (R-22) at 80° C. for 100 days or longer. It was found that the cross-linked type bonding layer of the above composition had a higher percentage of extractables than that of the epoxy impregnating varnish and had a percentage of extractables of 0.8% after 50-day soaking, so that the wire was not suitable as a self-bonding enameled wire for use in hermetic motors.

On the other hand, the epoxy resin in an epoxy impregnating varnish is not yet satisfactory for hermetic motors though it has in general excellent chemical resistance and its percentage of extractables is smaller than that of self-bonding enameled wire.

Further, an analysis revealed that the extract obtained in the above extraction test was a polymer of a low molecular weight.

Therefore, it becomes important to select a high-polymerization degree polymer resistant to swelling, extraction and dissolution in Freon as a base polymer of the bonding layer of self-bonding enameled wire for use in hermetic motors.

On the other hand, HCl is produced as a by-product in the course of the production of an epoxy resin and this HCl is removed as NaCl by neutralization with $Na_2CO_3$ or the like. A trivial amount of NaCl inevitably remains in the resin. If such an electrolyte is contained even in a trivial amount in the resin, the electrolyte dissolves out of the bonding resin prepared from this resin and causes corrosion of copper pipes, etc., of a compressor or the like. Moreover, the Cu ions thus formed by corrosion are chemically plated over the rotor shaft, etc., of a motor, resulting in a lowered running efficiency of the motor.

Therefore, it is also necessary to minimize the content of electrolytes represented by NaCl in the resin which forms a bonding layer.

A hermetic motor is repeatedly subjected to a pressure change in its heat hysteresis. Therefore, a blistering cycle test which is thought to promote this condition is important as an evaluation means for the refrigerant resistance of self-bonding enameled wire. Accordingly, dielectric breakdown voltage after a blister cycle was measured on the above mentioned conventional crosslinked self-bonding enameled wire and the epoxy impregnating varnish-treated wire. The results revealed that, as expected, the conventional crosslinked self-bonding enameled wire was inferior in the breakdown voltage after a blister cycle to the epoxy impregnating varnish-treated enameled wire.

Further, it is one of the important factors of self-bonding enameled wire for use in hermetic motors that a wire has a bonding strength sufficient to withstand magnetostrictive vibration in Freon at a high temperature. Accordingly, a bonding strength in Freon was measured by soaking a coil after formation of windings together with a weight in Freon (R-22), varying the temperature of Freon and determining a weight at which the windings were separated. These results also showed that the conventional crosslinked self-bonding enameled wire had rather low bonding strength as compared with the epoxy impregnating varnish-treated wire.

Not only the use of a high-polymerization degree polymer but also its crosslinking density play an important role in lowering the percentage of extractables, in Freon, of a bonding layer.

Therefore, the crosslinking densities of the conventional crosslinked self-bonding enameled wire and the epoxy impregnating varnish-treated enameled wire were determined by measuring gel fractions in cyclohexanone (100° C., 24 hours), with the result of 90% for the conventional crosslinked self-bonding enameled wire and 95% for the epoxy impregnating varnish-treated wire.

From these results, it was found necessary for the self-bonding enameled wire for use in hermetic motors to heighten the crosslinking density to at least about 95% of the epoxy impregnating varnish-treated wire.

Further, in addition to this heightening, acceleration of crosslinking is also an important requirement. That is, although current production processes of hermetic motors are mainly the so-called batchwise processes, automatic assembling conveyor lines or the like will be adopted in the future, so that a marked increase in the production rate will be required. Accordingly, it is expected that shortening of the crosslinking time of the bonding layer of self-bonding enameled wire is required and it becomes necessary that the bonding layer can crosslink to a high degree within a short time. Conventional crosslinked self-bonding enameled wire, however, has not reached this required level.

It has been turned out that in order to put self-bonding enameled wire into a practical use as hermetic motor windings, the above-mentioned various requirements must be satisfied.

This invention has been achieved on the basis of the above findings, and it is an object of this invention to provide a self-bonding enameled wire whose bonding layer is hard to attack by a refrigerant or the like and dissolve in the refrigerant even when it is soaked in a refrigerant, such as Freon, or a refrigerator oil at high temperatures for a long time, and does not cause any disadvantage for refrigerating apparatuses and which is suitable for use in hermetic motors.

It is a further object of the present invention to provide a hermetic motor having a stator coil formed with this self-bonding enameled wire.

One aspect of the present invention is directed to a self-bonding enameled wire having an electric insulation layer coated thereon and a bonding layer coated over the insulation layer. The bonding layer is prepared with a mixture including: (a) 100 parts by weight of a phenoxy resin and/or an epoxy resin, both the resins containing not larger than 5 PPM of sodium chloride and having a limiting viscosity of not less than 0.440 as measured in tetrahydrofuran solvent at 25° C.; and (b) 20 to 100 weight parts of a n-butylated melamine resin. In place of this n-butylated melamine resin, there is, according to another aspect of the present invention, used 20 to 50 parts by weight of a mixture of a stabilized polyisocyanate and one of a n-butylated melamine resin and a benzoguanamine resin is used. These self-bonding enameled wires are excellent in refrigerant resistance and may be used for windings of the stator coils in hermetic compressor motors.

As the base polymers of the resin composition which constitutes the bonding layer of the self-bonding enameled wire according to the present invention, there are used an epoxy resin and a phenoxy resin prepared by condensing epichlorohydrin with bisphenol A or a mixture of these resins.

Each of the phenoxy and epoxy resins has an NaCl content of 5 PPM or less and a limiting viscosity of 0.440 or more as measured at 25° C. in a tetrahydrofuran solvent.

The NaCl content must be 5 PPM or less to prevent the above-mentioned disadvantage that the NaCl in a bonding layer dissolves into a refrigerant and corrodes copper pipes, and its practical upper limit is 5 PPM.

Lowering of the NaCl content of each of these resins to 5 PPM or less can be achieved by purifying the resin by means of hot water washing with the help of ultrasonic waves or the like.

A limiting viscosity, as is well-known, represents a viscosity-average molecular weight of a polymer, and when determined under the same condition, the greater viscosity means the lower molecular weight. Accordingly, a resin of a high limiting viscosity is desirable, since it has been found as described above that a resin of a high molecular weight is required to heighten the refrigerant resistance. As a result of the determination of the limiting viscosity, at 25° C. in tetrahydrofuran, of each of various phenoxy and epoxy resins and the investigation of the refrigerant resistance of these resins, the inventors of this invention have found that satisfactory refrigerant resistance can be obtained when the polymer has a limiting viscosity of 0.440 or more, as measured under the above measurement conditions.

Figure 1:
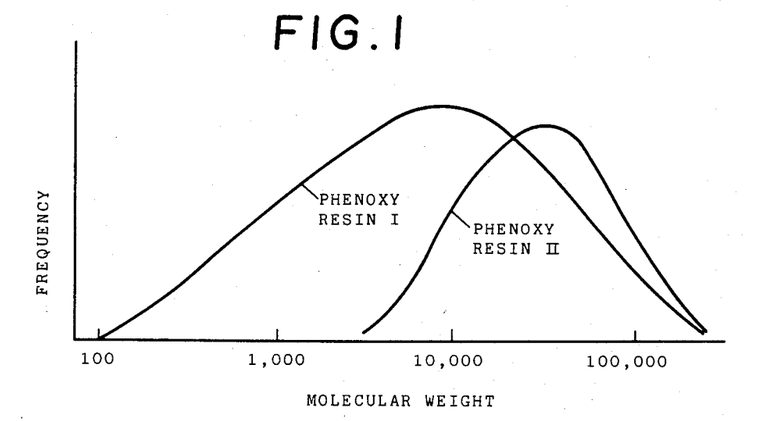
FIG. 1 is a graph of molecular weight distributions of two kinds of phenoxy resins.

Further, in order to heighten refrigerant resistance to a still higher degree, it is also desirable to select a resin having a low content of low-molecular weight portion by determining the molecular weight distribution of phenoxy and epoxy resins by gel permeation chromatography. FIG. 1 shows the molecular weight distribution of two kinds of phenoxy resins determined by gel permeation chromatography, and the phenoxy resin as shown in FIG. 1 by II is desirable. Further, in the case of the phenoxy resins (I), the low molecular weight portion may be selectively removed by treating with a mixed solvent consisting of methyl ethyl ketone as a good solvent and toluene as a poor solvent.

Incorporation of an epoxy resin in phenoxy resin increases reactive groups which take part in the crosslinking reaction and makes a contribution toward heightening a crosslinking density and a crosslinking rate without detriment to the excellent chemical resistance, adhesion and abrasion resistance of phenoxy resin itself. Moreover, the epoxy groups of an epoxy resin catch HCl formed by the reaction between Freon and a refrigerator oil and exhibit an effect of preventing corrosion of the metallic parts of a motor compressor, etc. In using a mixture of phenoxy and epoxy resins, their mixing ratio is generally such that 70 to 90% by weight of a phenoxy resin is present per 30 to 10% by weight of an epoxy resin.

Further, when a mixture of the n-butylated melamine resin or the benzoguanamine resin with the stabilized polyisocyanate which is used as a crosslinking agent for the above base polymers is used, the n-butylated melamine resin and the benzoguanamine resin, each having amino groups in the molecule, undergo a crosslinking reaction extremely easily with the base polymers, i.e., phenoxy and epoxy resins and, in addition, their amino groups catch the HCl formed by the reaction between Freon and a refrigerator oil and exhibit an effect of preventing corrosion. Moreover, the benzoguanamine resin has cyanuric rings having excellent heat and chemical resistance in the molecule, so that the phenoxy and epoxy resins crosslinked therewith can exhibit high heat and chemical resistance.

The above-mentioned stabilized polyisocyanates are those which are inactivated by temporarily masking (or blocking) the isocyanato groups of a polyisocyanate with a phenol, an amide or the like and used in the reaction after regenerating the isocyanato groups by removing the masking agent by the action of heat or a catalyst. The reaction of the stabilized polyisocyanate with the phenoxy or epoxy resin is of an addition reaction type, and therefore proceeds at a higher crosslinking reaction rate than the condensation reaction of the above-mentioned n-butylated melamine or benzoguanamine resin. With a view to heighten the overall rate of the crosslinking reaction, the stabilized polyisocyanate is used as part of the crosslinking agent.

The proportion of the stabilized polyisocyanate used is according to the present invention such that 10 to 40% by weight of the polyisocyanate is used per 90 to 60% by weight of the n-butylated melamine or the benzoguanamine resin. When the amount of the polyisocyanate is below 10% by weight, the crosslinking rate is low though wires having good heat and chemical resistance can be obtained. When the amount of the polyisocyanate is above 40% by weight, no wires which are satisfactory in respect of chemical and heat resistance can be obtained though the crosslinking rate is increased.

This crosslinking agent mixture is added in an amount ranging from 20 to 50 parts by weight per 100 parts by weight of the above base polymers. When this amount is below 20 parts by weight, the base polymers can not be crosslinked fully, so that the desired properties can not be obtained. When this amount is above 50 parts by weight, the crosslinking reaction proceeds excessively, causing embrittlement of a cured bonding layer and lowering of its mechanical strength and there arises a fear that a crosslinking reaction proceeds when it is applied as a bonding varnish in the steps of coating and baking.

It has been found by a subsequent investigation that the use of the above-mentioned stabilized polyisocyanate is not always necessary if, of the components of the above composition, the phenoxy resin and/or the epoxy resin, both of which have a sodium chloride content of 5 PPM or less and a limiting viscosity of 0.440 or more as determined at 25° C. in a tetrahydrofuran solvent and the n-butylated melamine resin, are used at a specified composition ratio. That is, it has been found that when the n-butylated melamine resin is used in a relatively large amount, the obtained product can be satisfactory in properties as compared with a composition containing the above-mentioned stabilized polyisocyanate. More particularly, the amount of the n-butylated melamine resin is within the range of from 20 to 100 parts by weight, preferably from 30 to 60 parts by weight per 100 parts by weight of the above-mentioned phenoxy resin and/or epoxy resin.

For a composition containing the above-mentioned stabilized polyisocyanate, the amount of the n-butylated melamine resin can be about 30 parts by weight or less, even about 10 parts by weight per 100 parts by weight of the phenoxy resin and/or epoxy resin since the stabilized polyisocyanate is used.

On the contrary, a composition containing a relatively large amount of the n-butylated melamine resin can be used as a bonding layer of a self-bonding enameled wire having excellent refrigerant resistance because the n-butylated melamine resin has no branched structure, its curing reaction can proceed over a wide range of temperature and so the cured product will show excellent resistance to heat, solvent, chemicals, etc.

When the amount of the n-butylated melamine resin is above 100 parts by weight per 100 parts by weight of the phenoxy resin and/or epoxy resin, the bonding layer becomes excessively hard, so that a problem of flexibility arises and accordingly this amount should be below the abovementioned value. When this amount is below 20 parts by weight, a high bonding strength especially at high temperatures can not be obtained. By specifying the amount within the range preferably from 30 to 60 parts by weight, all of the problems of flexibility, bonding strength at high temperatures, % extractables in Freon, etc., can be solved.

In order to further improve the crosslinking of the above bonding layer, a phenolate of 1,8-diaza-bicyclo[5,4,0], undecene-7 is added, if required. This compound functions as a crosslinking density modifier and accelerates the crosslinking reaction between the above base polymers and the above crosslinking agent mixture by promoting the polarization of the reactive groups of the both and prevents the reactive groups from remaining unreacted. The amount of this compound is in the range of from 0.1 to 10 parts by weight per 100 parts by weight of the above base polymers. When this amount is below 0.1 part by weight, the crosslinking density modifier becomes insufficient, whereas when it exceeds 10 parts by weight, the pot life in a state of a bonding varnish or of the bonding layer of the self-bonding enameled wire is shortened, which is disadvantageous in actual practice.

The mixture of the above base polymers, the crosslinking agent mixture and the crosslinking density modifier is dissolved in a solvent such as cyclohexanone or Cellosolve to form a bonding varnish of a solids concentration of 10 to 20% by weight, then applied to a conductor through an insulating layer and baked into a bonding layer. Although the above insulating layer is not particularly limited, the one formed by applying and baking an insulating varnish such as a conventional polyester-imide varnish, polyamide-imide varnish, polyester-amide-imide varnish or polyester varnish is suitable when the heat and chemical resistance of the resulting self-bonding enamel wire are considered as a whole. In this case, however, the productivity of motors is generally reduced as compared with conventional enameled wire having no bonding layer, because there is a need of forming, around a stator core, motor windings which are in a state in which the bonding layer is half-cured. This is because the bonding layer which is the outermost layer is liable to be damaged by jigs, tools, etc., during insertion of motor windings or formation of end coils, because the film hardness of the bonding layer is softer than that of conventional enameled wire.

It becomes possible to impart to an insulating layer a mechanical strength of film differing greatly from that of a bonding layer by using a polyamide-imide as the insulating layer on the area in contact with the bonding layer, and therefore it becomes possible to protect the insulating layer from being attacked by the mechanical pressures and frictional forces of tools, jigs, etc., exerted on the bonding layer at the sacrifice of the latter.

For instance, when a polyester-imide, a polyester or the like is used as an insulating layer, it is difficult to prevent mechanical deterioration (damage), which is exerted during the production of motors, only by a bonding layer, so that the factors of mechanical degradation in the bonding layer directly affects the insulating layer.

It is most suitable for maintaining the heat resistance of a bonding layer after curing that a polyamide-imide is used as a combination with the insulating layer on the area in contact with the bonding layer, and this exhibits a marked effect of preventing damages during motor production. It is preferable that the thickness of the polyamide-imide film of the insulating layer on the area in contact with the bonding layer is not less than $5\mu$, and wires having an insulating layer of a double-layer structure, in which a material of a polyester type is used as an underlayer of a polyamide-imide layer for the purpose of reducing the material cost of the insulating layer, have an large practical value.

Application and baking of the above bonding varnish can be carried out by using conventional production equipment for enameled wire, and the temperature of a baking oven is set at about 250° C. The finished thickness of the bonding layer ranges from 5 $\mu$m to 50 $\mu$m and is selected suitable depending on the use or the like, but it is generally about 10 to 20 $\mu$m in the case of hermetic motors.

Moreover, when a composition comprising the abovementioned phenoxy resin and/or epoxy resin and the n-butylated melamine resin is used as a bonding layer, its thickness must be $15\mu$ or less, preferably $10\mu$ or less, from the viewpoint of, especially, flexibility.

The self-bonding enameled wire of this invention obtained in this way is further wound into a coil to prepare the hermetic motor of this invention. The hermetic motor of this invention is generally prepared in the following way. The above self-bonding enameled wire is wound around laminate cores comprising silicon steel sheet to form a main coil and an auxiliary coil, and then these coils, after being subjected to steps of layer insulation, coil molding, lead wire connection, coil fastening, molding surge test, annealing, etc., are sent to a curing oven, wherein each core is heated to crosslink the bonding layer. The heating conditions include a temperature of about 120° to 250° C. and a time of about 5 to 30 minutes. In this heat treatment the bonding layer of the self-bonding enameled wire which is thus wound around the coil is first molten to fill the spaces among the wires with the molten resin and becomes continuous. Then, the crosslinking reaction is started and the bonding layer is cured to form a stator coil in which the wires are united by firmly fixing them with the cured bonding layer. The obtained stator is combined with a rotor which is produced separately to obtain a desired hermetic motor, which is then incorporated in a compressor.

In the hermetic motor stator coil thus obtained, there is used, as a bonding layer of the self-bonding enameled wire which forms the coil, a bonding layer obtained by crosslinking and curing a specified phenoxy resin and/or a specified epoxy resin with a crosslinking agent comprising a mixture of the n-butylated melamine resin or the benzoguanamine resin and the stabilized polyisocyanate and, if necessary, a phenolate of 1,8-diaza-bicyclo[5,4,0]undecene-7. Therefore the bonding layer is in a state obtained by crosslinking the high molecular weight base polymers at a high crosslinking density and neither swells nor dissolves in a refrigerant such as Freon and has high refrigerant resistance. Accordingly, a hermetic motor having this stator coil also becomes excellent in refrigerant resistance, so that it can be run stably for a long time in the presence of Freon, and in addition, does not cause troubles of the compressor, pipe system, capillaries, etc., of a refrigerator.

EXAMPLE 1

There was prepared an adhesive composition for each sample wire as set forth in TABLE 1. These adhesive compositions were each dissolved into cyclohexanone to produce an adhesive varnish containing 17 wt.% of solid components.

In TABLE 1, the phenoxy resin (I) of which molecular weight distribution is shown in FIG. 1 was a phenoxy resin containing 500 PPM of sodium chloride and having limiting viscosity number of 0.332 (at 25° C. in tetrahydrofuran), the phenoxy resin (II) of which molecular weight distribution is shown in FIG. 1 a phenoxy resin containing 3 PPM of sodium chloride and having limiting viscosity number of 0.450 (at 25° C. in tetrahydrofuran), the epoxy resin (I) an epoxy resin containing 500 PPM and having limiting viscosity number of 0.332 (at 25° C. in tetrahydrofuran), the epoxy resin (II) an epoxy resin containing 3 PPM of sodium chloride and having limiting viscosity number of 0.450 (25° C. in tetrahydrofuran), the n-butylated melamine resin one produced and sold by Mitsui Toatsu Kagaku K.K., Japan under the tradename "Uban 20 SE", the benzoguanamine resin one manufactured and sold by Dainihon Ink K.K., Japan under the tradename "Super-betsucamine TD-126", the stabilized polyisocyanate tolylendiisocyanate (TDI) masked (blocked) with xylenol, and the cross-linking density modifier a phenolate of 1,8-diaza-bicyclo[5,4,0]undecene-7 produced and sold by Sunabot K.K., Japan under the tradename "U-CAT. SA NO. 1."

Each adhesive varnish thus prepared was applied over an enameled copper wire of 1.0 mm diameter (hereinafter referred to AI/EI wire) which had been coated with a primary insulation layer of 40 μm thickness consisting of a baked polyesterimide varnish and a secondary insulation layer of 10 μm thickness consisting of a baked polyamideimide, those varnishes being conventional ones widely used. The adhesive varnish applied wires were then each baked at 250° C. in a baking oven to thereby produce a self-bonding insulated wire having an adhesive overcoating layer of 15 μm thickness. Subsequently, these self-bonding insulated wires were subjected to a heat treatment at 180° C. for 0.5 hour for curing the adhesive layers to thereby produce wires 1–12 according to the present invention, comparative wires 1 and 2 and conventional wires 1–4. These samples were subjected to refrigerant resistance tests 1 and 2, in which after being soaked in Freon R-22 at 80° C. for 24 hours (test 1) or 150 days (test 2), each sample was measured as to R-22 extractables, blistering temperature and abrasion resistance. The results of these tests 1 and 2 are set forth in TABLE 2 together with cross-linking density of the adhesive layers of the samples and the appearance of the samples after soaking in liquid R-22. In TABLE 2 there are also given test results of conventional wire 5 which was an AI/EI wire impregnated with an epoxy P-varnish containing 17 wt. % of solid components and backed at 160° C. for 5 hours (this sample is hereinafter referred to as P-varnish/AI/EI wire). The epoxy P-varnish used was of the same kind as sold by P. D. George Co., U.S.A., under the tradename "Pedegree 923".

As clearly seen from TABLE 2, the insulated wire according to the present invention was superior in refrigerant resistance to not only the conventional self-bonding insulated wire (conventional wires 1–4) but also the P-varnish/AI/EI wire (conventional wire 5) which was widely used in the prior art hermetic motors. Further it was noted that comparative wire 1 swelled in Freon and was slightly opaque since it had relatively small crosslinking density and relatively high percentage of extractables, and that comparative wire 2 was brittle since it was less extensible and had unreacted substances.

TABLE 1

| Adhesive Composition | Conventional Wire | | | | Wire according to the Present Invention | | | | | | | | | | | | Comparative Wire | |
|---|---|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | 12 | 1 | 2 |
| Phenoxy resin (I) | 100 | 80 | 50 | — | — | — | — | — | — | — | — | — | — | — | — | — | — | — |
| Phenoxy resin (II) | — | — | — | — | 100 | 80 | 50 | 80 | 80 | 80 | 80 | 80 | 80 | 80 | 80 | 80 | 100 | 100 |
| Epoxy resin (I) | — | — | — | 100 | — | — | — | — | — | — | — | — | — | — | — | — | — | — |
| Epoxy resin (II) | — | 20 | 50 | — | — | 20 | 50 | 20 | 20 | 20 | 20 | 20 | 20 | 20 | 20 | 100 | — | — |
| N—butylated melamine resin | — | — | — | — | 30 | 30 | 30 | 30 | — | 30 | 30 | 30 | 15 | 22 | 38 | 30 | 10 | 40 |
| Benzoguanamine | 30 | 30 | 30 | 30 | — | — | — | — | 30 | — | — | — | — | — | — | — | — | — |
| Stabilized polyisocyanate | — | — | — | — | 10 | 10 | 10 | 10 | 10 | 10 | 10 | 10 | 5 | 8 | 12 | 10 | 5 | 20 |
| Cross-linking density modifier | — | — | — | — | — | — | — | — | — | 1 | 3 | 10 | 3 | 3 | 3 | — | — | — |
| Total | 130 | 130 | 130 | 130 | 140 | 140 | 140 | 140 | 140 | 141 | 143 | 150 | 123 | 133 | 153 | 140 | 115 | 160 |

TABLE 2

| | Test | | Conventional Wire | | | | | Wire according to the Present Invention | | | | |
|---|---|---|---|---|---|---|---|---|---|---|---|---|
| | | | 1 | 2 | 3 | 4 | 5 | 1 | 2 | 3 | 4 | 5 |
| Refrigerant Resistance Test 1 | R-22 Extractables % | | 0.3 | 0.3 | 0.3 | 0.3 | 0.28 | 0.05 | 0.05 | 0.05 | 0.05 | 0.09 |
| | Blistering temperature*[1] (in 10 min.) | 120° C. | X | X | X | X | X | X | X | X | X | X |
| | | 130° C. | X | X | X | X | X | X | X | X | X | X |
| | | 140° C. | XX | XX | XX | XX | X | X | X | X | X | X |
| | | 150° C. | XXX | XXX | XXX | XXX | XX | X | X | X | X | X |
| | | 160° C. | XXX | XXX | XXX | XXX | XXX | XX | XX | XX | XX | XX |

TABLE 2-continued

|  |  |  | | | | | | | | | | |
|---|---|---|---|---|---|---|---|---|---|---|---|---|
|  |  | 170° C. | XXX | XXX | XXX | XXX | XXX | XXX | XXX | XXX | XXX | XXX |
|  |  | 180° C. | XXX | XXX | XXX | XXX | XXX | XXX | XXX | XXX | XXX | XXX |
|  |  | 190° C. | XXX | XXX | XXX | XXX | XXX | XXX | XXX | XXX | XXX | XXX |
|  | Abrasion resistance*2 (%) |  | 98 | 98 | 98 | 98 | 106 | 105 | 105 | 105 | 105 | 105 |
| Refrigerant Resistance Test 2 | R-22 Extractables % | | 0.8 | 0.8 | 0.8 | 0.8 | 0.60 | 0.25 | 0.24 | 0.21 | 0.23 | 0.29 |
|  | Blistering temperature (in 10 min.) | 120° C. | X | X | X | X | X | X | X | X | X | X |
|  |  | 130° C. | XX | XX | XX | XX | X | X | X | X | X | X |
|  |  | 140° C. | XXX | XXX | XXX | XXX | XXX | X | X | X | X | X |
|  |  | 150° C. | XXX | XXX | XXX | XXX | XXX | X | X | X | X | X |
|  |  | 160° C. | XXX | XXX | XXX | XXX | XXX | XXX | XXX | XXX | XXX | XXX |
|  |  | 170° C. | XXX | XXX | XXX | XXX | XXX | XXX | XXX | XXX | XXX | XXX |
|  |  | 180° C. | XXX | XXX | XXX | XXX | XXX | XXX | XXX | XXX | XXX | XXX |
|  |  | 190° C. | XXX | XXX | XXX | XXX | XXX | XXX | XXX | XXX | XXX | XXX |
|  | Abrasion resistance (%) | | 80 | 80 | 80 | 80 | 85 | 95 | 95 | 95 | 95 | 95 |
| Cross-linking density (%) | | | 90 | 90 | 90 | 90 | 95 | 95 | 95 | 95 | 95 | 95 |
| Appearance after soaking | | | | | | *3 | good | | | | | |

|  |  |  | Wire according to the Present Invention | | | | | | | Comparative Wire | |
|---|---|---|---|---|---|---|---|---|---|---|---|
| Test |  |  | 6 | 7 | 8 | 9 | 10 | 11 | 12 | 1 | 2 |
| Refrigerant Resistance Test 1 | R-22 Extractables % | | 0.03 | 0.03 | 0.04 | 0.04 | 0.03 | 0.03 | 0.05 | 0.5 | 0.08 |
|  | Blistering temperature*1 (in 10 min.) | 120° C. | X | X | X | X | X | X | X | X | X |
|  |  | 130° C. | X | X | X | X | X | X | X | XXX | X |
|  |  | 140° C. | X | X | X | X | X | X | X | XXX | XX |
|  |  | 150° C. | X | X | X | X | X | X | X | XXX | XXX |
|  |  | 160° C. | X | X | X | X | X | X | XX | XXX | XXX |
|  |  | 170° C. | XX | XX | XX | XX | XX | XX | XXX | XXX | XXX |
|  |  | 180° C. | XXX | XXX | XXX | XXX | XXX | XXX | XXX | XXX | XXX |
|  |  | 190° C. | XXX | XXX | XXX | XXX | XXX | XXX | XXX | XXX | XXX |
|  | Abrasion resistance*2 (%) |  | 103 | 103 | 103 | 102 | 104 | 103 | 105 | 85 | 99 |
| Refrigerant Resistance Test 2 | R-22 Extractables (%) | | 0.15 | 0.09 | 0.07 | 0.13 | 0.11 | 0.09 | 0.25 | 1.0 | 0.15 |
|  | Blistering temperature (in 10 min.) | 120° C. | X | X | X | X | X | X | X | XX | X |
|  |  | 130° C. | X | X | X | X | X | X | X | XXX | X |
|  |  | 140° C. | X | X | X | X | X | X | X | XXX | XX |
|  |  | 150° C. | X | X | X | X | X | X | X | XXX | XXX |
|  |  | 160° C. | X | X | X | X | X | X | XXX | XXX | XXX |
|  |  | 170° C. | XXX | XXX | XXX | XXX | XXX | XXX | XXX | XXX | XXX |
|  |  | 180° C. | XXX | XXX | XXX | XXX | XXX | XXX | XXX | XXX | XXX |
|  |  | 190° C. | XXX | XXX | XXX | XXX | XXX | XXX | XXX | XXX | XXX |
|  | Abrasion resistance (%) | | 101 | 101 | 101 | 99 | 102 | 105 | 95 | 70 | 94 |
| Cross-linking density (%) | | | 99 | 99 | 99 | 99 | 99 | 99 | 95 | 80 | 95 |
| Appearance after soaking | | | | | | good | | | | *3 | good |

*1X, XX and XXX designate that no blister, small blisters and large blisters were noted respectively.
*2Abrasion resistance was measured according to Japanese Industrial Standards (JIS) C3003 (equivalent to IEC Publication 317-9) and is expressed in the rate to the initial abrasion resistance.
*3slightly opaque.

EXAMPLE 2

The wires 4 and 7 according to the present invention and the conventional wires 2 and 5 as defined in Example 1 were subjected to the following tests:

(3) Extraction resistance test in which the extraction rate of the coating materials in liquid R-22 were measured with the wires soaked in it at 80° C.;

(4) Blister cycle test in which after various blister cycles the samples were measured as to dielectric strength and bond strength; and (5) Bond strength test in which bond strength of the adhesive layer of each sample was measured with the sample soaked in R-22.

Figure 2:
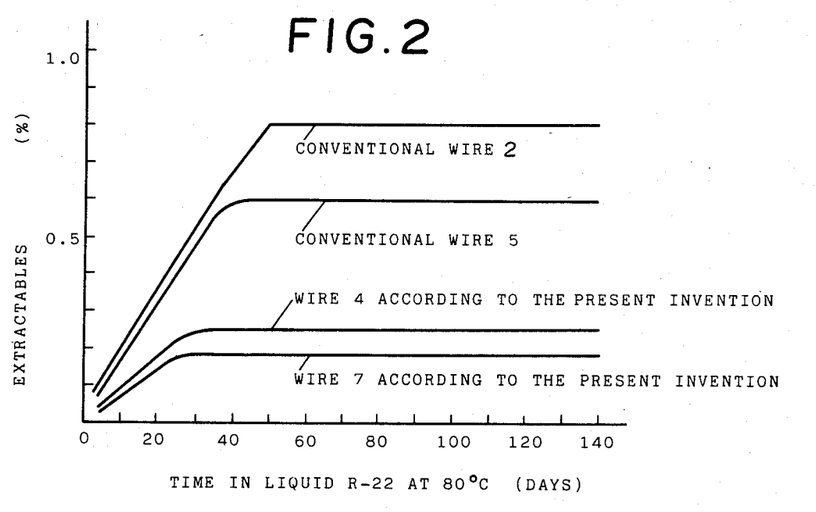
FIG. 2 is a graph of % extractables, in Freon (R-22), of the coating layers of self-bonding enameled wires according to the present invention and conventional enameled wires.

The results of the extraction resistance test are plotted in FIG. 2, from which it is seen that the wires 4 and 7 according to the present invention were less extractable in liquid R-22 at the relatively high temperature than the conventional wires 2 and 5. It is considered that this unexpected result of the present invention was produced by the specific molecular weight of the base polymers and the use of the cross-linking agents.

Figure 3:
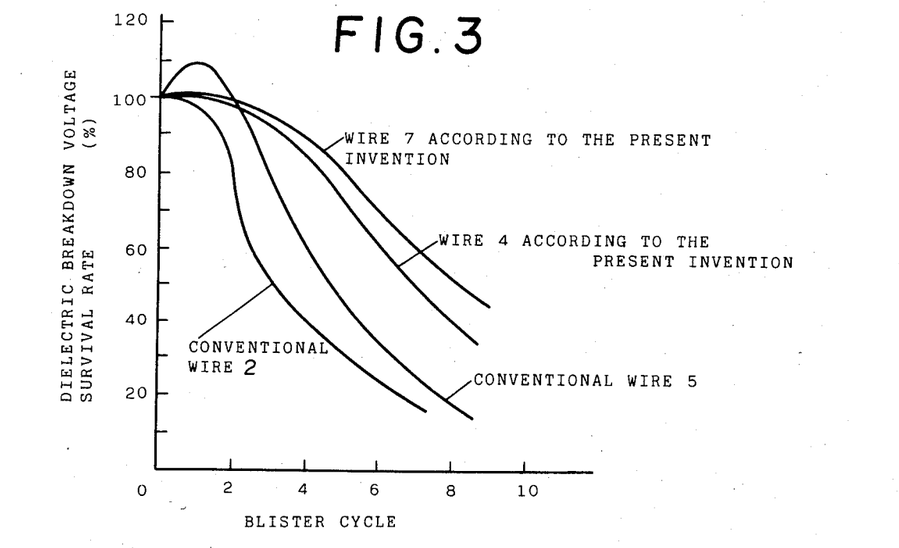
FIG. 3 is a graph of dielectric breakdown voltage survival rate of the enameled wires after various blister cycles.
Figure 4:
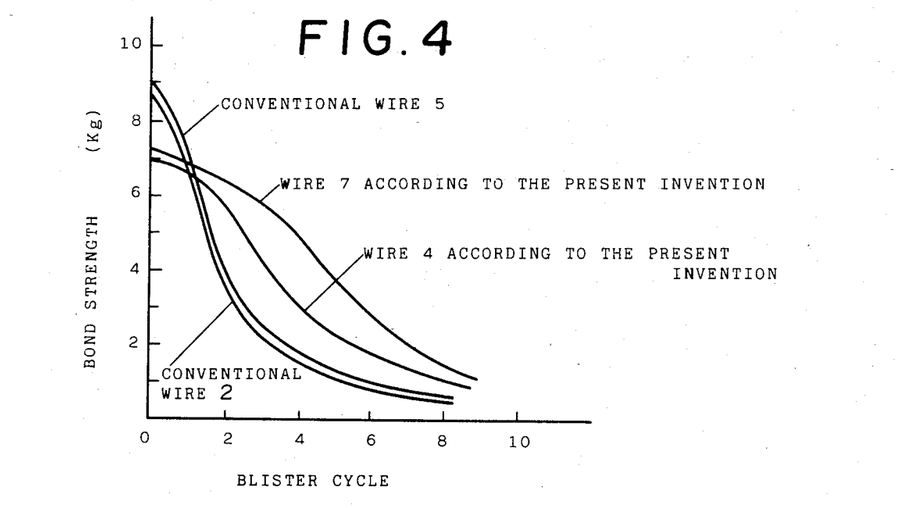
FIG. 4 is a graph of bonding strength of the enameled wires after various blister cycles.

The blister cycle test is a test in which a hermetic motor which is soaked in a refrigerant is subjected to repeated pressure variation under a heat historesis on conditions similar to actual running conditions but in an accelerated manner. This blister cycle test is one of the important tests for evaluating refrigerant resistance of the insulated wire. For one cycle of the blister cycle test carried out, the samples were soaked in liquid R-22 at 90° C. for 72 hours, during which they were heated up to 150° C. for 10 min. After this blister cycle test, the samples were measured as to survival rate (%) against a dielectric breakdown voltage of 12 KV and bond strength (Kg), which was measured by NEMA MW-1000. The results of the tests are given in FIGS. 3 and 4.

Figure 5:
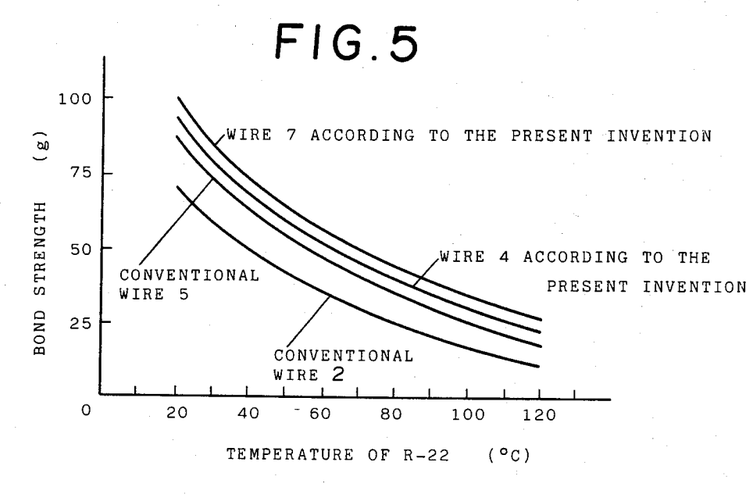
FIG. 5 is a graph showing the temperature dependency of bonding strength, in R-22, of the enameled wires.

The test of bond strength in the refrigerant is to judge whether or not the wires withstand magnetostrictive vibration when they are applied to the hermetic motors. In this test the wires were each compactly wound and then subjected to heat treatment to form a tubular coil, which was hung within a case with a weight attached to its lower end and soaked in liquid R-22 contained in it. Under this condition the temperature of R-22 was gradually elevated to determine the temperature and weight at which adjacent windings bonded together of each coil are separated. The results are plotted in FIG. 5 for showing the temperature dependency of the bonding strength.

As clearly seen from FIGS. 2-5 the wires 4 and 7 according to the present invention were superior in refrigerant resistance to the conventional wires 2 and 5, and it is hence presumed that hermetic motors applied with the self-bonding insulated wires according to the present invention exhibit in practical use more reliability for longer period of time than the hermetic motors using the conventional wires.

EXAMPLE 3

Figure 6:
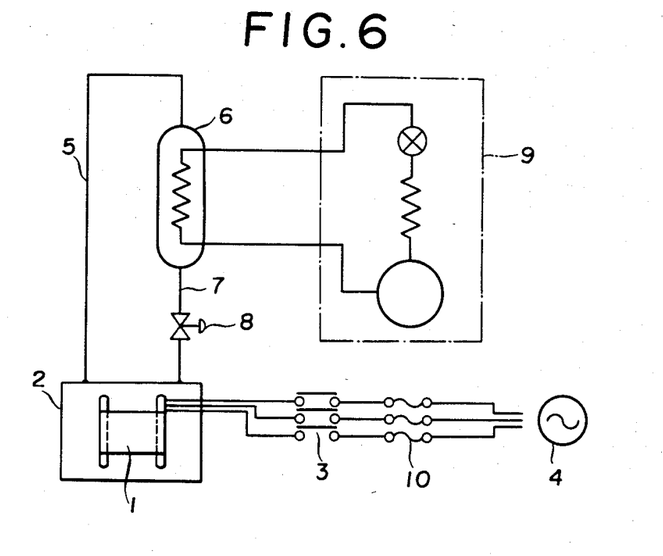
FIG. 6 is a schematic diagram of equipments for testing the accelerated life of electric motors using the enameled wires.

There were each built ten hermetic motors, which were 3 phase-3.75 KW motors used for 50 Hz, 200 V, by the use of the wires 4 and 7 according to the present invention as defined in Example 1, and each hermetic motor thus built was subjected to an accelerated life test by using a refrigeration cycle shown in FIG. 6. Further, there were built ten hermetic motors having each a stator coil formed of the AI/EI wire as defined in Example 1 and five other hermetic motors each having a stator coil formed of the P-varnish/AI/EI wire as defined in Example 1.

FIG. 6 illustrates equipments for conducting an accelerated life test of the hermetic motors, in which an electric motor 1 to be tested is received in a sealed case 2 having refrigerant R-22 filled in it and is connected through magnetic contactors 3, fuses 10 and a control unit not shown to a three-phase power source 4. Gaseous R-22 in the case 2 is passed through a conduit 5 to a cooler/condenser 6, where it is cooled and requefied by another refrigerant from a refrigerator 9. The requefied R-22 is returned through a conduit 7 and a solenoid valve 8 to the case 2.

In this test the control unit allowed current to flow the windings of each motor for 6 seconds and then stopped current for 234, seconds. This sequence was repeated every four minutes. During this test the rotor of each motor 1 was locked to thereby supply overcurrent to it so that it underwent the highest magnetic vibration. For comparison in life of the motors tested the number of ON/OFF cycles of the motor current was counted until the fuse 10 of each motor was broken down. The results of the test are shown in TABLE 3.

TABLE 3

| Motor No. | AI/EI Wire | P-varnish/ AI/EI Wire | Wire 4 according to the Present Invention | Wire 7 according to the Present Invention |
|---|---|---|---|---|
| 1 | 550 | 3785 | 5323 | 2555 |
| 2 | 1730 | 1135 | 3177 | 6270 |
| 3 | 635 | 2090 | 6489 | 6135 |
| 4 | 2630 | 7705 | 7272 | 5090 |
| 5 | 1740 | 565 | 4707 | 6865 |
| 6 | 765 | — | 6178 | 5230 |
| 7 | 60 | — | 4581 | 8080 |
| 8 | 495 | — | 5521 | 7210 |
| 9 | 530 | — | 5643 | 3530 |
| 10 | 1510 | — | 2299 | 5915 |
| X̄ | 1065 | 3055 | 5121 | 5690 |
| Max | 2630 | 7705 | 7272 | 3080 |
| Min | 60 | 565 | 2299 | 2555 |

It is seen from TABLE 3 that the hermetic motors using the self-bonding insulated wires according to the present invention had much longer average life and smaller life fluctuation than not only the hermetic motors using the AI/EI wire but also the hermetic motors using P-varnish/AI/EI wire which are widely used in the market.

EXAMPLE 4

There were prepared adhesive compositions given in TABLE 4, which were then each dissolved in cyclohexanone to form an adhesive varnish containing 17 wt. % of solid components. The adhesive varnish thus prepared were each applied over an AI/EI wire of the same kind as used in Example 1 except that the polyesterimide insulation layer has a thickness of 20 μm. Thereafter, the varnish-applied wires were baked on the same conditions as in Example 1 to produce wires 21-38 each having an adhesive overcoating layer of 10 μm thickness.

These wires 21-38 were tested to evaluate various characteristics thereof. The results of the tests are given in TABLE 4. The test as to flexibility was carried out by winding three samples of the same wire around each of 5 mandrels having diameters equal to (×1), twice (×2), three times (×3), four times (×4) and five times (×5) the diameter thereof respectively. The number of cracked samples out of three is given in TABLE 4. In the test as to cross-linking density, a helical coil was formed with each wire according to NEMA-MW-1000 and cured at 180° C. for 30 min. After soaking in cyclohexanone at 100° C. for 24

TABLE 4

| ADHESIVE COMPO-SITION | | WIRE | | | | | | | | | | Parts by weight | | | | | | | |
|---|---|---|---|---|---|---|---|---|---|---|---|---|---|---|---|---|---|---|---|
| | | 21 | 22 | 23 | 24 | 25 | 26 | 27 | 28 | 29 | 30 | 31 | 32 | 33 | 34 | 35 | 36 | 37 | 38 |
| Phenoxy resin (II) | | 100 | 100 | 100 | 100 | 100 | 100 | 100 | 100 | — | — | — | — | — | — | — | — | 100 | — |
| N—butylated melamine resin | | 0 | 10 | 20 | 30 | 50 | 60 | 80 | 100 | — | — | — | — | — | — | — | — | 120 | — |
| Epoxy resin (II) | | — | — | — | — | — | — | — | — | 100 | 100 | 100 | 100 | 100 | 100 | 100 | 100 | — | 100 |
| N—butylated melamine resin | | — | — | — | — | — | — | — | — | 0 | 10 | 20 | 30 | 50 | 60 | 80 | 100 | — | 120 |
| FLEXI-BILITY | X1 | 0/3 | 0/3 | 0/3 | 0/3 | 0/3 | 0/3 | 1/3 | 1/3 | 0/3 | 0/3 | 0/3 | 0/3 | 0/3 | 0/3 | 1/3 | 2/3 | 3/3 | 3/3 |
| | X2 | 0/3 | 0/3 | 0/3 | 0/3 | 0/3 | 0/3 | 0/3 | 1/3 | 0/3 | 0/3 | 0/3 | 0/3 | 0/3 | 0/3 | 1/3 | 1/3 | 3/3 | 3/3 |
| | X3 | 0/3 | 0/3 | 0/3 | 0/3 | 0/3 | 0/3 | 0/3 | 0/3 | 0/3 | 0/3 | 0/3 | 0/3 | 0/3 | 0/3 | 0/3 | 1/3 | 3/3 | 3/3 |
| | X4 | 0/3 | 0/3 | 0/3 | 0/3 | 0/3 | 0/3 | 0/3 | 0/3 | 0/3 | 0/3 | 0/3 | 0/3 | 0/3 | 0/3 | 0/3 | 0/3 | 1/3 | 1/3 |
| | X5 | 0/3 | 0/3 | 0/3 | 0/3 | 0/3 | 0/3 | 0/3 | 0/3 | 0/3 | 0/3 | 0/3 | 0/3 | 0/3 | 0/3 | 0/3 | 0/3 | 1/3 | 1/3 |
| HEAT SOFTENING TEMPERATURE (°C.) | | 340 | 360 | 375 | 380 | 381 | 380 | 383 | 380 | 335 | 355 | 370 | 375 | 376 | 375 | 378 | 375 | 372 | 370 |

TABLE 4-continued

| ADHESIVE COMPOSITION | WIRE | | | | | | | | | | Parts by weight | | | | | | | |
| --- | --- | --- | --- | --- | --- | --- | --- | --- | --- | --- | --- | --- | --- | --- | --- | --- | --- | --- |
| | 21 | 22 | 23 | 24 | 25 | 26 | 27 | 28 | 29 | 30 | 31 | 32 | 33 | 34 | 35 | 36 | 37 | 38 |
| BONDING STRENGTH AT 100° C. (Kg) | 5.0 | 6.0 | 9 | 14 | 15 | 15 | 15 | 15 | 4.8 | 5.8 | 8.8 | 13.8 | 14.8 | 14.8 | 14.8 | 14.8 | 8.8 | 9.0 |
| CROSS-LINKING DENSITY | 50 | 85 | 95 | 98 | 99 | 99 | 99 | 99 | 49 | 84 | 94 | 97 | 98 | 98 | 98 | 98 | 91 | 90 |
| R-22 EXTRACTABLES (%) | 10 | 0.6 | 0.15 | 0.09 | 0.08 | 0.09 | 0.10 | 0.13 | 11 | 0.7 | 0.17 | 0.11 | 0.10 | 0.11 | 0.12 | 0.15 | 0.45 | 0.5 | hours each coil was measured as to gel index of the adhesive layer for determining cross-linking density.

It is clearly seen from TABLE 4 that the adhesive layers made of compositions including 20 to 100 weight parts, particularly 30 to 60 weight parts of the n-butylated melamine resin per 100 weight parts of the phenoxy resin (II) or the epoxy resin (II) were excellent in flexibility, heat softening resistance, cross-linking density, high temperature bond strength and R-22 extraction rate, and they were equal in properties to the adhesive layers, used in Example 1, made of compositions containing the stabilized polyisocyanate. From these results it is presumed that self-bonding insulated wires having adhesive layers made of the above-mentioned compositions are useful in the refrigerant resistive magnet wire.

EXAMPLE 5

There were built three kinds of hermetic motors which were 3 phase, 3.75 KW motors for 50 Hz, 200 V, each kind consisting ten motors using one of the samples 24, 26 and 33, which motors were subjected to the same accelerated life test as in Example 3.

The results of the test are set forth in TABLE 5. From comparison of the results given in TABLES 3 and 5 it is apparent that the hermetic motors using samples 24, 26 and 33 had much longer average life and smaller life fluctuation than the widely used hermetic motors using the P-varnish/AI/EI wires.

TABLE 5

| Motor | Wire 24 | Wire 26 | Wire 33 |
| --- | --- | --- | --- |
| 1 | 5130 | 2750 | 5310 |
| 2 | 3681 | 6390 | 3771 |
| 3 | 6353 | 6315 | 6513 |
| 4 | 7350 | 5210 | 7430 |
| 5 | 4901 | 7010 | 4913 |
| 6 | 6111 | 5350 | 6381 |
| 7 | 4378 | 8150 | 4598 |
| 8 | 5121 | 7500 | 5621 |
| 9 | 5627 | 3730 | 5713 |
| 10 | 2590 | 5900 | 2650 |
| $\bar{X}$ | 5124 | 5830 | 5290 |
| Max | 7350 | 8150 | 7430 |
| Min | 2590 | 2750 | 2650 |

What is claimed is:

1. A self-bonding enameled wire having an electric insulation layer coated thereon and a bonding layer coated over the insulation layer, characterized in that the bonding layer is prepared with a mixture including:
   (a) 100 parts by weight of a phenoxy resin and/or an epoxy resin, both the resins containing not larger than 5 ppm of sodium chloride and having a limiting viscosity of not less than 0.440 as measured in tetrahydrofuran solvent at 25° C.; and
   (b) 20 to 100 weight parts of a n-butylated melamine resin.

2. The self-bonding enameled wire of claim 1 wherein the mixture further includes 0.1 to 10 weight parts of a phenolate of 1,8-diaza-bicyclo[5,4,0]undecene-7 per 100 weight parts of the phenoxy resin and/or the epoxy resin.

3. The self-bonding enameled wire of claim 1 or 2 wherein the insulation layer is made of a polyamideimide.

4. The self-bonding enameled wire of claim 3 wherein the insulation layer includes two sub-layers made of electric insulation varnish of different kinds.

5. A hermetic compressor motor comprising a stator coil formed with the self-bonding enameled wire of claim 1.

6. A self-bonding enameled wire having an electric insulation layer coated thereon and a bonding layer coated over the insulation layer, characterized in that the bonding layer is prepared with a mixture including:
   (a) 100 parts by weight of a phenoxy resin and/or an epoxy resin, both the resins containing not larger than 5 PPM of sodium chloride and having a limiting viscosity of not smaller than 0.440 as measured in a tetrahydrofuran solvent at 25° C.; and
   (b) 20 to 50 parts by weight of a mixture of a stabilized polyisocyanate and one of a n-butylated melamine resin and a benzoguanamine resin.

7. The self-bonding enameled wire of claim 6 wherein the mixture further includes 0.1 to 10 weight parts of a phenolate 1,8-diaza-bicyclo [5,4,0]undecene-7 per 100 weight parts of the phenoxy resin and/or the epoxy resin.

8. The self-bonding enameled wire of claim 6 or 7 wherein the insulation layer is made of a polyamideimide.

9. The self-bonding enameled wire of claim 8 wherein the insulation layer includes two sub-layers made of electric insulation varnishes of different kinds.

10. A hermetic compressor motor comprising a stator coil formed with the self-bonding enameled wire of claim 6.

11. A hermetic compressor motor comprising a stator coil formed with the self-bonding enameled wire of claim 4.

12. A hermetic compressor motor comprising a stator coil formed with the self-bonding enameled wire of claim 9.

* * * * *